(12) United States Patent
Choi et al.

(10) Patent No.: US 9,350,848 B2
(45) Date of Patent: May 24, 2016

(54) METHOD FOR DISTRIBUTING, INSTALLING AND EXECUTING SOFTWARE-DEFINED RADIO APPLICATION

(71) Applicant: INDUSTRY-UNIVERSITY COOPERATION FOUNDATION HANYANG UNIVERSITY, Seoul (KR)

(72) Inventors: Seung Won Choi, Seoul (KR); Chi Young Ahn, Bucheon-si (KR); Hyun Wook Yang, Seoul (KR); June Kim, Incheon (KR); Yong Kim, Seoul (KR); Dong Hyun Kuem, Siheung-si (KR); Sae Hee Bang, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 0 days.

(21) Appl. No.: 14/391,884

(22) PCT Filed: Apr. 12, 2013

(86) PCT No.: PCT/KR2013/003109
§ 371 (c)(1),
(2) Date: Oct. 10, 2014

(87) PCT Pub. No.: WO2013/154398
PCT Pub. Date: Oct. 17, 2013

(65) Prior Publication Data
US 2015/0052515 A1    Feb. 19, 2015

(30) Foreign Application Priority Data

| Apr. 12, 2012 | (KR) | 10-2012-0038045 |
| Apr. 12, 2012 | (KR) | 10-2012-0038062 |
| Aug. 17, 2012 | (KR) | 10-2012-0089783 |
| Aug. 20, 2012 | (KR) | 10-2012-0090575 |
| Oct. 25, 2012 | (KR) | 10-2012-0119229 |
| Dec. 7, 2012 | (KR) | 10-2012-0141664 |

(51) Int. Cl.
*G06F 9/445* (2006.01)
*H04M 1/725* (2006.01)

(52) U.S. Cl.
CPC .............. *H04M 1/72525* (2013.01); *G06F 8/61* (2013.01); *G06F 8/665* (2013.01); *G06F 9/445* (2013.01)

(58) Field of Classification Search
CPC ......... H04L 67/10; H04L 41/50; H04L 29/06; H04W 12/06; H04B 10/25754; G06K 7/0008; G06F 8/20; G06F 8/38; G06F 9/545; G06F 8/61; G06F 5/445; H04M 1/72525
See application file for complete search history.

(56) References Cited

U.S. PATENT DOCUMENTS

| 8,107,939 B2 | 1/2012 | Hassan et al. |
| 8,595,186 B1 * | 11/2013 | Mandyam ................. G06F 8/38 707/632 |

(Continued)

FOREIGN PATENT DOCUMENTS

| JP | 2005-223788 A | 8/2005 |
| KR | 1020020071217 A | 9/2002 |

(Continued)

OTHER PUBLICATIONS

International Search Report dated Jul. 30, 2013; PCT/KR2013/003109.

*Primary Examiner* — Tuan Vu
(74) *Attorney, Agent, or Firm* — Ladas & Parry LLP

(57) ABSTRACT

Disclosed is a method for distributing, installing and operating software-defined radio-based radio application independent of hardware and a user application. The radio application comprises a radio controller code and a user-defined function block code. A radio application package for distributing and installing the radio application includes pipeline component metadata for constituting a pipeline of the radio application. The user-defined function block code may be provided in the form of an execution code, a source code or an intermediate representation, and the radio controller code and the user-defined function block code may call a standard function block. Accordingly, with the configuration of the radio application of the present invention and the method for distributing, installing and operating the radio application according to the present invention, various wireless communication systems can be used independently of a modem chip just by downloading and installing the radio application.

20 Claims, 11 Drawing Sheets

(56) References Cited

U.S. PATENT DOCUMENTS

| | | | |
|---|---|---|---|
| 2002/0184610 A1* | 12/2002 | Chong | G06F 8/20 717/109 |
| 2005/0165726 A1* | 7/2005 | Kawell, Jr. | H04L 29/06 |
| 2006/0203722 A1* | 9/2006 | Oommen | H04L 41/50 370/229 |
| 2007/0207792 A1* | 9/2007 | Loving | G06F 9/545 455/418 |
| 2009/0300656 A1* | 12/2009 | Bosworth | H04L 67/10 719/320 |
| 2010/0060422 A1* | 3/2010 | Van Nest | G06K 7/0008 340/10.1 |
| 2011/0113232 A1* | 5/2011 | Westmeijer | G06F 9/445 713/2 |
| 2012/0134666 A1* | 5/2012 | Casterline | H04B 10/25754 398/22 |
| 2013/0183935 A1* | 7/2013 | Holostov | H04W 12/06 455/411 |

FOREIGN PATENT DOCUMENTS

| | | |
|---|---|---|
| KR | 1020080040103 A | 5/2008 |
| KR | 20100097687 A | 9/2010 |

* cited by examiner

METHOD FOR DISTRIBUTING, INSTALLING AND EXECUTING SOFTWARE-DEFINED RADIO APPLICATION

TECHNICAL FIELD

The present invention relates to methods for distribution, installation, and executing of radio applications for a software-defined radio (SDR) terminal, and more particularly to methods for distribution, installation, and executing of SDR radio applications which operate independently on hardware and user applications.

BACKGROUND ART

As communication technology advances, various new kinds of radio applications are being used as adapted for tastes and objectives of users. The most of radio applications, such as a Long Term Evolution (LTE), a Wide-band Code Division Multiple Access (WCDMA), a Worldwide Interoperability for Microwave Access (WiMAX), a Global System for Mobile Communications (GSM), may operate on radio terminals by interworking with a modem embedded in the radio terminal.

In order to make it possible that a radio application controls the modem, a customized module should be developed based on understanding unique instructions of each modem designed by various modem manufactures or having various models. This situation leads to a result that a specific application can be executed on a specific modem designed by a specific manufacturer, or even on a specific model of modem designed by the specific manufacturer. To overcome the above-mentioned problem, different control instruction codes customized for various kinds of modems should be comprised in the radio application, or different executable file for each modem should be built and distributed.

However, since it is practically impossible to optimize the radio application to all the various kinds of modem hardware currently available in the market currently by the above-mentioned methods, there is a problem that a great manpower is needed to develop a radio application.

Technical Problem

In order to resolve the above-described problems, the present invention provides methods for distributing software defined radio applications which operate independently on hardware and user applications.

In order to resolve the above-described problems, the present invention also provides methods for installing software defined radio applications which operate independently on hardware and user applications.

In order to resolve the above-described problems, the present invention also provides methods for operating software defined radio applications which operate independently on hardware and user applications.

Technical Solution

In some example embodiments of the present invention, a radio application distribution method using a radio application package for installing a radio application into a terminal, the method may comprise generating a radio application package; and uploading the radio application package to a server, wherein the radio application package includes radio controller codes, function block codes, and pipeline configuration metadata.

Here, the function block codes may include standard function block codes which are codes calling function blocks implemented using dedicated hardware logics included in a radio processor of the terminal or codes operating on a core of the radio processor of the terminal; and user-defined function block codes which are not provided as the standard function block codes or which are customized from functions provided by the standard function block codes.

Also, when the standard function block codes are provided as execution codes executable on the radio processor of the terminal, the radio application package may further include a radio library comprising the execution codes.

Also, the user-defined function block codes may be at least one of execution codes executable on the radio processor of the terminal, source codes which can be compiled into execution codes executable on the radio processor of the terminal, and intermediate representation (IR) codes which can be compiled into execution codes executable on the radio processor of the terminal.

Also, when the user-defined function block codes are source codes or IR codes, the user-defined function block codes may be included in the radio application package as encrypted.

Also, the pipeline configuration metadata may define relations among the radio controller codes, the user-defined function blocks, and the standard function blocks for data transmission functions or data reception functions of the radio application.

Also, the radio controller codes may be execution codes executed on an application processor or the radio processor of the terminal, provide a user application with context information of the radio application, and transmit/receive data with a networking stack of a communication service layer existing on the application processor or the radio processor.

In other example embodiments of the present invention, a method for installing a radio application into a user terminal by using a radio application package, the method may comprise downloading a radio application package from a server; and installing a radio application included in the radio application package into the user terminal, wherein the radio application package includes radio controller codes, function block codes, and pipeline configuration metadata.

Here, the function block codes may include standard function block codes which are codes calling function blocks implemented using dedicated hardware logics included in a radio processor of the terminal or codes operating on a core of the radio processor of the terminal; and user-defined function block codes which are not provided as the standard function block codes or which are customized from functions provided by the standard function block codes.

Also, when the standard function block codes are provided as execution codes executable on the radio processor of the terminal, the radio application package may further include a radio library comprising the execution codes.

Also, the user-defined function block codes may be at least one of execution codes executable on the radio processor of the terminal, source codes which can be compiled into execution codes executable on the radio processor of the terminal, and intermediate representation (IR) codes which can be compiled into execution codes executable on the radio processor of the terminal.

Also, when the user-defined function block codes are source codes or IR codes, the user-defined function block codes may be compiled using a compiler executed by the application processor or the radio processor of the terminal.

Also, when the user-defined function block codes are source codes or IR codes, the user-defined function block codes may be included in the radio application package as encrypted.

Also, the radio controller codes may be execution codes executed on an application processor or the radio processor of the terminal, provide a user application with context information of the radio application, and transmit/receive data with a networking stack of a communication service layer existing on the application processor or the radio processor.

Also, in the installing the radio application, the radio controller codes and the function block codes may be installed into a storage device which can be accessed by at least one of an application processor and a radio processor of the terminal by referring to the pipeline configuration metadata.

In still other example embodiments of the present invention, a method of executing a radio application comprising function block codes and radio controller codes in a terminal having an application processor and a radio processor, the method may comprise receiving an execution instruction for the radio application; and loading the radio controller codes and the function block codes from a storage part by referring to pipeline configuration metadata of the radio application, wherein the radio controller codes are executed by the application processor or the radio processor, and the user-defined function block codes are executed by the radio processor.

Here, the function block codes may include standard function block codes which are codes calling function blocks implemented using dedicated hardware logics included in a radio processor of the terminal or codes operating on a core of the radio processor of the terminal; and user-defined function block codes which are not provided as the standard function block codes or which are customized from functions provided by the standard function block codes.

Also, a radio control framework which operates on at least one of the application processor and the radio processor may provide the radio controller codes and the function block codes with operation environments.

Also, when the radio control framework operates on both the application processor and the radio processor, the radio control framework may be configured to comprise a part executed on the application processor and a part executed on the radio processor.

Also, when the radio control framework operates on both the application processor and the radio processor, the radio controller codes may operate on the application processor.

Also, when the radio control framework operates only on the radio processor, the radio controller codes may operate only on the radio processor.

Also, the radio control framework may include at least one of a configuration manager (CM) performing installation/uninstallation of the radio application and creating/deleting an instance of the radio application and managing radio parameters for the radio application; a radio connection manager (RCM) performing activation/deactivation of the radio application and managing user data flow switching between radio applications; a flow controller (FC) controlling sending/receiving and flows of user data packets; a multi-radio controller (MRC) scheduling requests for spectrum resources issued by radio applications; and a resource manager (RM) sharing radio resources with radio applications.

Advantageous Effects

When a software defined radio terminal apparatus according to the present invention, as described above, is used, the same application may be executed in terminals having modem chips with different structures thorough a standard baseband API. Also, by providing various digital signal processing algorithms needed in wireless digital communication based on the standard baseband API for optimal digital signal processing, manufacturers of modem hardware may select hardware or software implementation according to complexity and power consumption of each block included in the standard baseband API, and producers of radio applications may produce radio applications which are independent of the modem hardware using the standard baseband API. Also, various extensions of the baseband API may be possible by providing user-defined type blocks to implement functions not included in the standard baseband API.

BEST MODE

Figure 1:
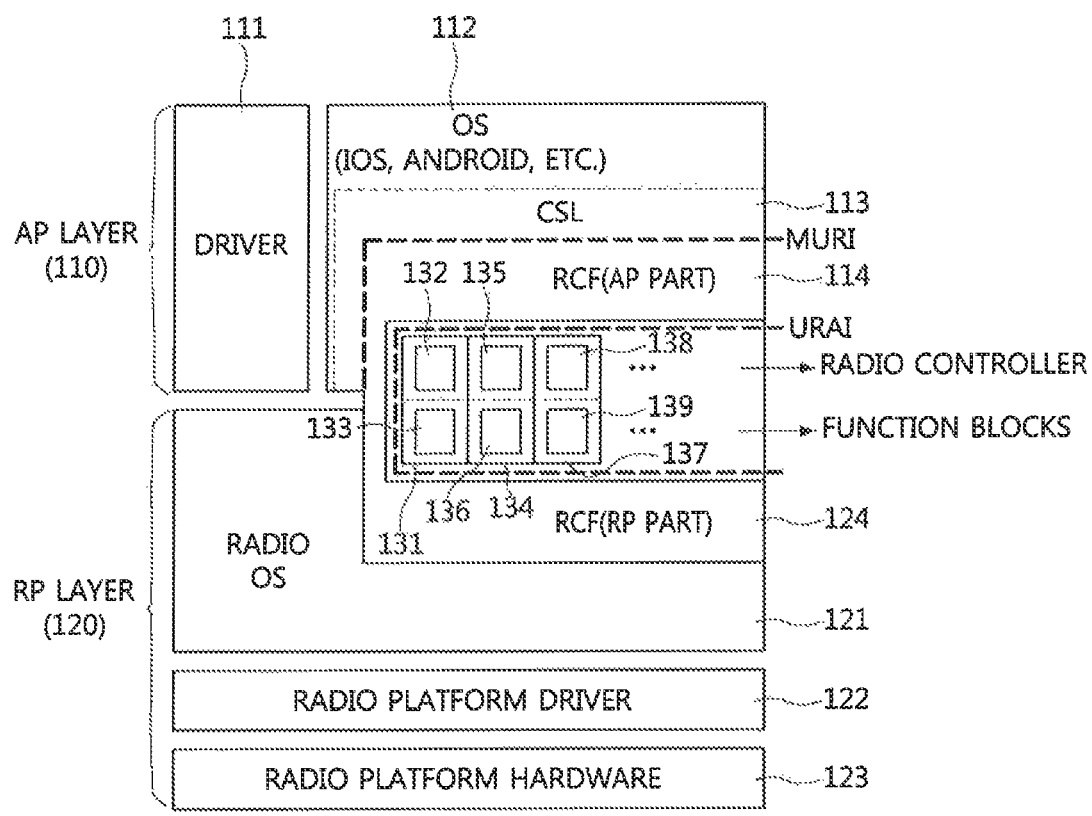
FIGS. 1 and 2 are block diagrams to explain a software architecture environment on which a radio application according to the present invention is executed.

The present invention may be variously modified and may include various embodiments. However, particular embodiments are exemplarily illustrated in the drawings and will be described in detail. However, it should be understood that the particular embodiments are not intended to limit the present disclosure to specific forms, but rather the present disclosure is meant to cover all modification, similarities, and alternatives which are included in the spirit and scope of the present disclosure. Like reference numerals refer to like elements throughout the description of the drawings.

Relational terms such as first, second, A, B, and the like may be used for describing various elements, but the elements should not be limited by the terms. The terms are used solely for distinguishing one element from another. For instance, without departing the scope of the present disclosure, a first element may be named as a second element, and similarly, a second element may be named as a first element. The term "and/or" encompasses both combinations of the plurality of related items disclosed and any item from among the plurality of related items disclosed.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is not for delimiting the present invention but for describing the specific embodiments. The terms of a singular form may include plural forms unless otherwise specified. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments according to the present invention will be described in detail with reference to the accompanying drawings. In describing the invention, to facilitate the entire understanding of the invention, like numbers refer to like elements throughout the description of the figures, and a repetitive description on the same element is not provided.

Terminologies used for explaining the present invention are defined as follows. Other terminologies except the following terminologies will be defined in the corresponding part of the present specification.

- Radio Application (RA): an application which provides a radio communication environment independent on specific hardware configurations and user applications according to a distribution/installation/operation framework of the present invention. The radio application may be executed on a radio processor. Alternatively, the radio application may be configured to comprise a part which is executed on a radio processor and a part which is executed on an application processor, and to operate on the two processors. The radio application may comprise a radio controller and function blocks. The function blocks may include standard function blocks and user defined function blocks.
- Radio Application Package (RAP): As a distribution form of a radio application, a RAP may include a radio controller and function blocks which are components of the radio application, and also include pipeline configuration metadata. In addition, the radio application package may further include a radio library.
- Standard Function Block (SFB): It is a standardized function block each of which has a standardized function and a standardized function name used for calling the function. In case that radio platform chip vendors develop the standard function blocks, the standard function blocks may be a set of function blocks implemented by the vendors, and may be provided with a driver used for driving the blocks. The standard function blocks may be implemented by using a dedicated hardware accelerator, or implemented as executable codes to be executed on a radio processor core. If the standard function blocks are implemented as executable codes to be executed on a radio processor core, a set of the standard function blocks may be referred to as a radio library. Each of the standard function blocks has standardized name and feature for its function, and may be defined by using a standard baseband Application Programming Interface (API) header.
- User-Defined Function Block (UDFB): It is a function block which can be provided by radio application providers. A UDF may have a function which is not provided as a standard function block or a function which is customized from an existing standard function block. It may be implemented to be executed on a radio processor core. The user-defined function blocks may be provided in forms of executable codes, source codes, or intermediate representation (IR) codes.
- User Defined Function Block (UDFB) set: A set of user-defined function blocks which are provided by radio application providers.

Configuration and Software Architecture of a Radio Application

Figure 2:
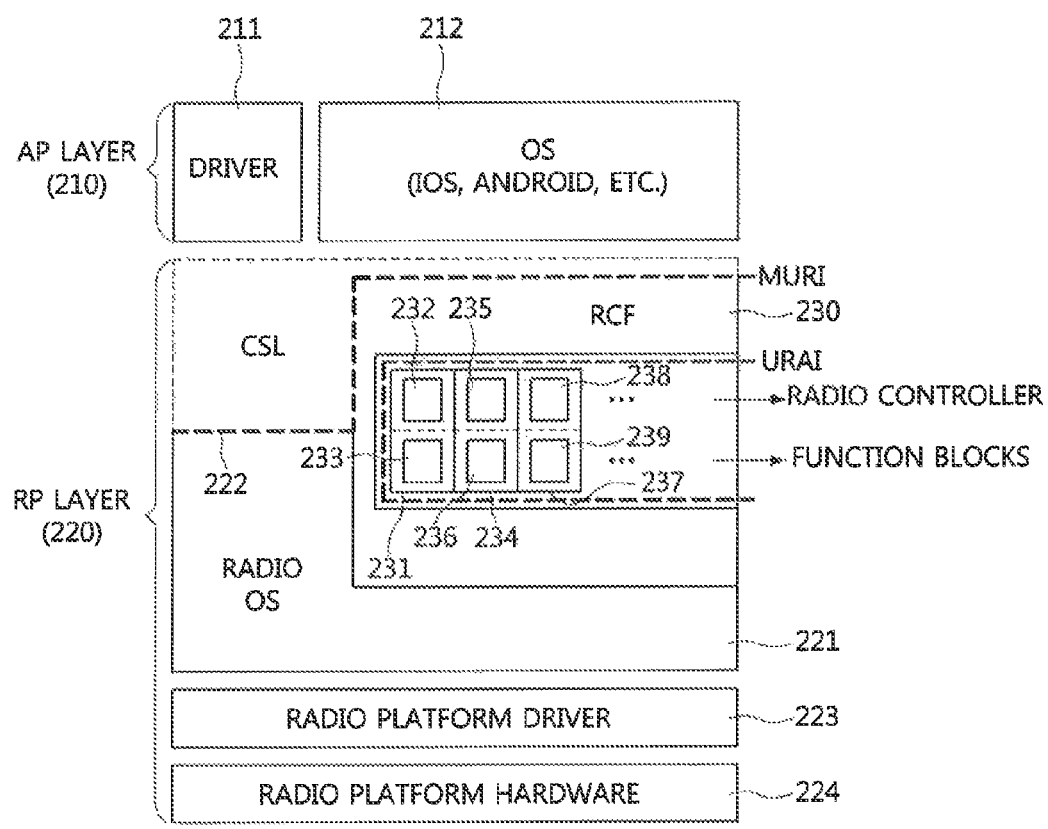

FIGS. 1 and 2 are block diagrams to explain a software architecture environment on which a radio application according to the present invention is executed.

Referring to FIG. 1 and FIG. 2, a radio software architecture according to the present invention may comprise an application processor layer 110 which operates on an application processor (AP) and a radio processor layer 120 which operates on a radio processor (RP). Here, the radio processor may be also referred to as a baseband processor (BP).

FIG. 1 illustrates a software architecture environment where a radio control framework (RCF), which is described later, is divided into two parts—a part being executed on the AP (referred to as an AP layer part) and a part being executed on the RP (referred to as a RP layer part), and executed on the two processors. Also, FIG. 2 illustrates a software architecture environment where a RCF is executed only on the radio processor.

A non-real time OS such as Android OS of Google, iOS of Apple, etc. may operate on the application processor, and a real time OS (hereinafter, referred to as a 'radio OS') may operate on the radio processor. Hereinafter, for clear discrimination, the non-real time OS operating on the application processor layer may be referred to as 'OS', and the real time OS operating on the radio processor layer may be referred to as 'radio OS'.

Hereinafter, the application processor layer, the radio processor layer, and components constituting the radio control framework will be described in detail.

(1) Application Processor Layer

The application processor layer comprises the following components, as shown in FIG. 1 and FIG. 2.

- Driver 111, 211: They drive hardware devices on a given OS.
- OS 112, 212: Non-real time OS (e.g. Android and iOS) operating in general mobile devices.

If the radio control framework is configured to operate on the application processor and the radio processor both (as shown in FIG. 1), an application processor layer part 114 of the radio control framework may exist on the OS. If the radio control framework is configured to operate only on the radio processor (as shown in FIG. 2), the radio control framework does not exist on the application processor layer.

If the radio control frame work operates on both the processors (a composition of FIG. 2), a communication service layer 113 may exist on the OS of the application processor.

The communication service layer may be a layer providing at least some of the following three services to the radio control framework.

The first service is related to an administrative. It may be a service related to installation/uninstallation of radio applications, creating/deleting instance of radio applications, and acquisition of a list of radio applications in each status (installed, instanced, activated).

The second service is related to connection control. It may be a service related to activation/deactivation of radio applications, creation of data flow, creation of network allocation, and acquisition of a list of radio applications in each status (installed, instanced, activated).

The third service is related to data flow. That is, this service is a service related to sending/receiving user data.

As an example of communication service layer configurations for providing at least some of the above-described three services, the communication service layer may be configured to comprise an administrator application, a mobility policy manager application, a networking stack (i.e. a protocol stack operating on the communication service layer), and a monitor application.

However, the communication service layer may comprise only some of the above-described components, and may further comprise additional components as well as the above-described components. Also, one or more components among the above components may be integrated into a single component existing within the communication service layer. Also, the above-described components are only examples of components which the communication service layer can comprise in order to support services which should be performed by the communication service layer. That is, the communication service layer may be defined based on functions performed by it. The above-described exemplary composition of components does not restrict composition of the communication service layer.

In the configuration in which the radio control framework operates on both the AP and the RP (the composition of FIG. 1), radio applications 131, 134, and 137 to which distribution/installation/operation methods according to the present invention are applied may respectively comprise application processor layer parts 132, 135, and 138 and radio processor layer parts 133, 136, and 139. A radio controller (RC) which is the application processor layer part of radio application may be configured to transmit context information to a monitor application of the communication service layer, transmit data to a networking stack of the communication service layer, and receive data from the networking stack.

(2) Radio Processor Layer

The radio processor layer comprises the following components, as shown in FIG. 1 and FIG. 2.

Radio operating systems 121 and 221 are real time operation systems.

If the radio control framework is configured to operate on both the application processor and the radio processor (as shown in FIG. 1), a radio processor layer part 124 of the radio control framework may exist on the radio OS. If the radio control frame work operates only on the radio processor (as shown in FIG. 2), the radio control framework does not exist on the application processor layer. That is, the radio control framework exists only on the radio processor layer.

If the radio control frame work exists only on the radio processor (as shown in FIG. 2), the communication service layer 222 exists only on the radio OS 221.

Since role and configuration of the communication service layer 222 illustrated in FIG. 2 are identical to those of the communication service layer 113 illustrated in FIG. 1, redundant explanations are omitted.

Radio platform drivers 122 and 223 are components demanded for the radio OS to recognize a hardware radio platform similarly to usual hardware drivers.

Radio platform hardware 123 and 224 may be configured as core(s) of the radio processor and baseband accelerators The baseband accelerators prepared for the standard function block(s) may usually be provided in form of application-specific integrated circuit (ASIC).

If the radio control framework is configured to operate only on the radio processor (i.e. a configuration shown in FIG. 2), radio applications 231, 234, and 237 which are targets of distribution, installation, and operation methods according to the present invention may be executed on the radio processor layer.

Radio controllers 132, 135, and 138 of respective radio applications may be configured to transmit context information to a monitor application of the communication service layer, transmit data to a networking stack of the communication service layer, and receive data from the networking stack.

A multi-radio interface (MURI) is an interface between the communication service layer and the control framework, and a unified radio application interface (URAI) is an interface between the radio application and the control framework.

A radio application is an application enabling communications of a mobile terminal, and may be distributed in form of a radio application package. Components of a radio application package may be configured as follows.

1) User Defined Function Block (UDFB)
2) Pipeline configuration metadata
3) Radio controller code (RC code)
4) Radio library—a radio library is distributed in form of executable codes as included in a radio application package, when the standard function blocks (SFB) are distributed as executable codes.

The radio application package may be downloaded onto the OS of the application processor layer, and the user-defined function block codes and the radio library may be loaded from the application processor to the radio processor by referring to the pipeline configuration metadata, and finally loaded to the radio OS on the radio processor layer.

(3) Radio Control Framework

The radio control framework (RCF) 130 or 230 is a component for providing operation environment of radio applications.

If the radio control framework is configured to operate on both the application processor and the radio processor (as shown in FIG. 1), components of the radio control framework may be classified into two groups 114 and 124. That is, one group operates on the application processor, and other group operates on the radio processor. Which components of the RCF operate on the radio processor (i.e. in real-time) and which components of the RCF operate on the AP (i.e. in non-real-time) may be determined differently by each vendor.

If the radio control framework is configured to operate only on the radio processor (i.e. a configuration of FIG. 2), the radio control framework exists only on the radio processor layer without discrimination of a radio processor layer part and an application processor layer part.

Basically, the RCF may include at least some of the following 5 components for managing radio applications.

However, the radio control framework may comprise only some of the following 5 components, and may further comprise additional components as well as the following 5 components. Also, one or more components among the following components may be integrated into a single component existing within the radio control framework.

The role of the radio control framework may be defined based on functions performed by the components which will be described. The following exemplary components do not restrict composition of the radio control framework. That is, the radio control framework may have various configurations at least some of functions of the following components.

1) Configuration Manager (CM): Installation/uninstallation and creating/deleting instance of radio applications into RP as well as access management of radio parameters for radio applications.

2) Radio Connection Manager (RCM): Activation/deactivation of RAs according to user requests, and overall management of user data flows, which can also be switched from one RA to another.

3) Flow Controller (FC): Sending and receiving of user data packets and controlling the flow of signaling packets.

4) Multiradio Controller (MRC): Scheduling the requests for radio resources issued by concurrently executing RAs and detecting and managing the interoperability problems among the concurrently executing RAs.

5) Resource Manager (RM): Managing the computational resources to share them among simultaneously active RAs, and to guarantee their real-time requirements.

Figure 3:
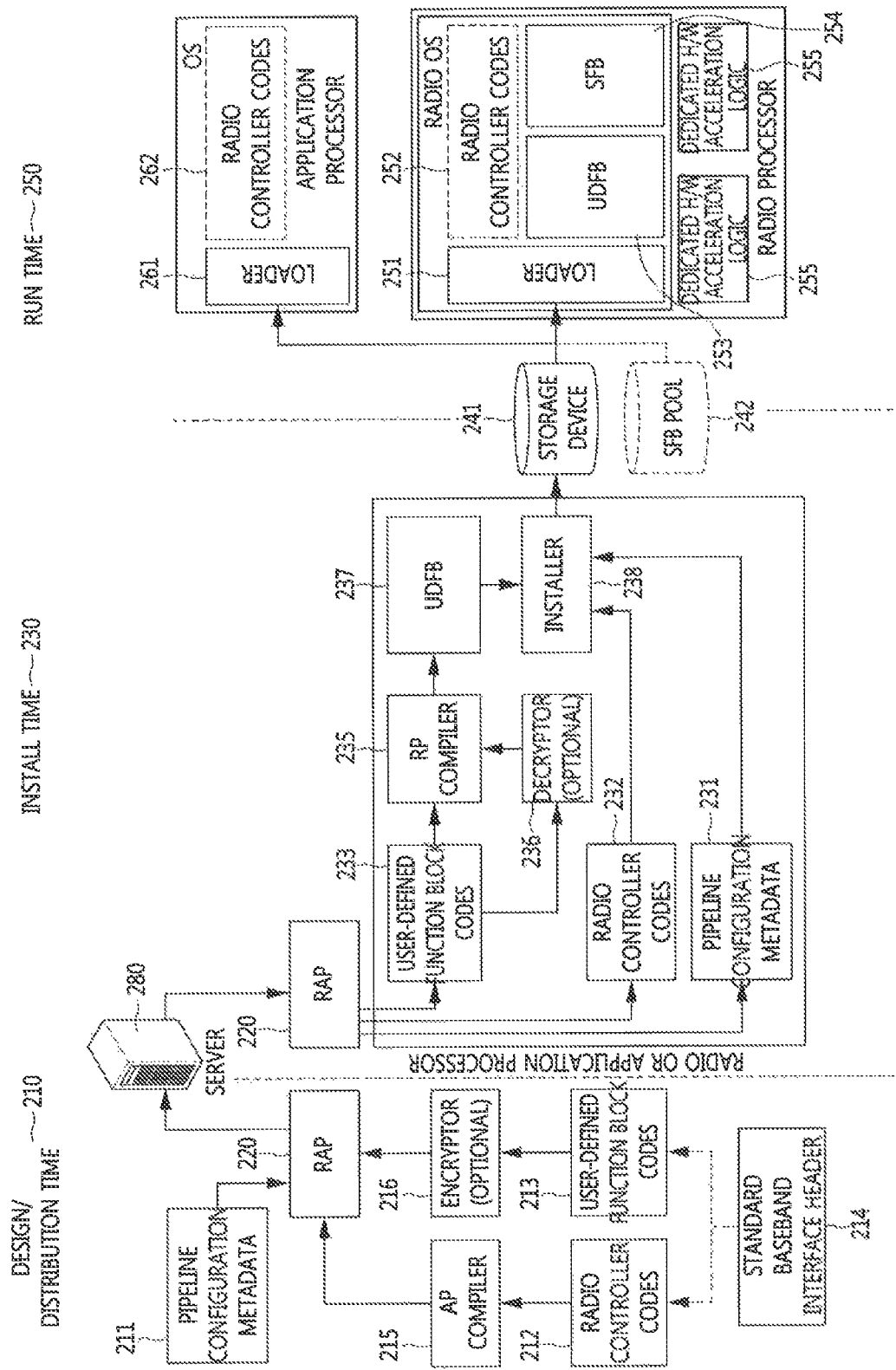
FIGS. 3 to 5 are conceptual diagrams to illustrate procedures for distribution to execution of radio applications according to the present invention.
Figure 4:
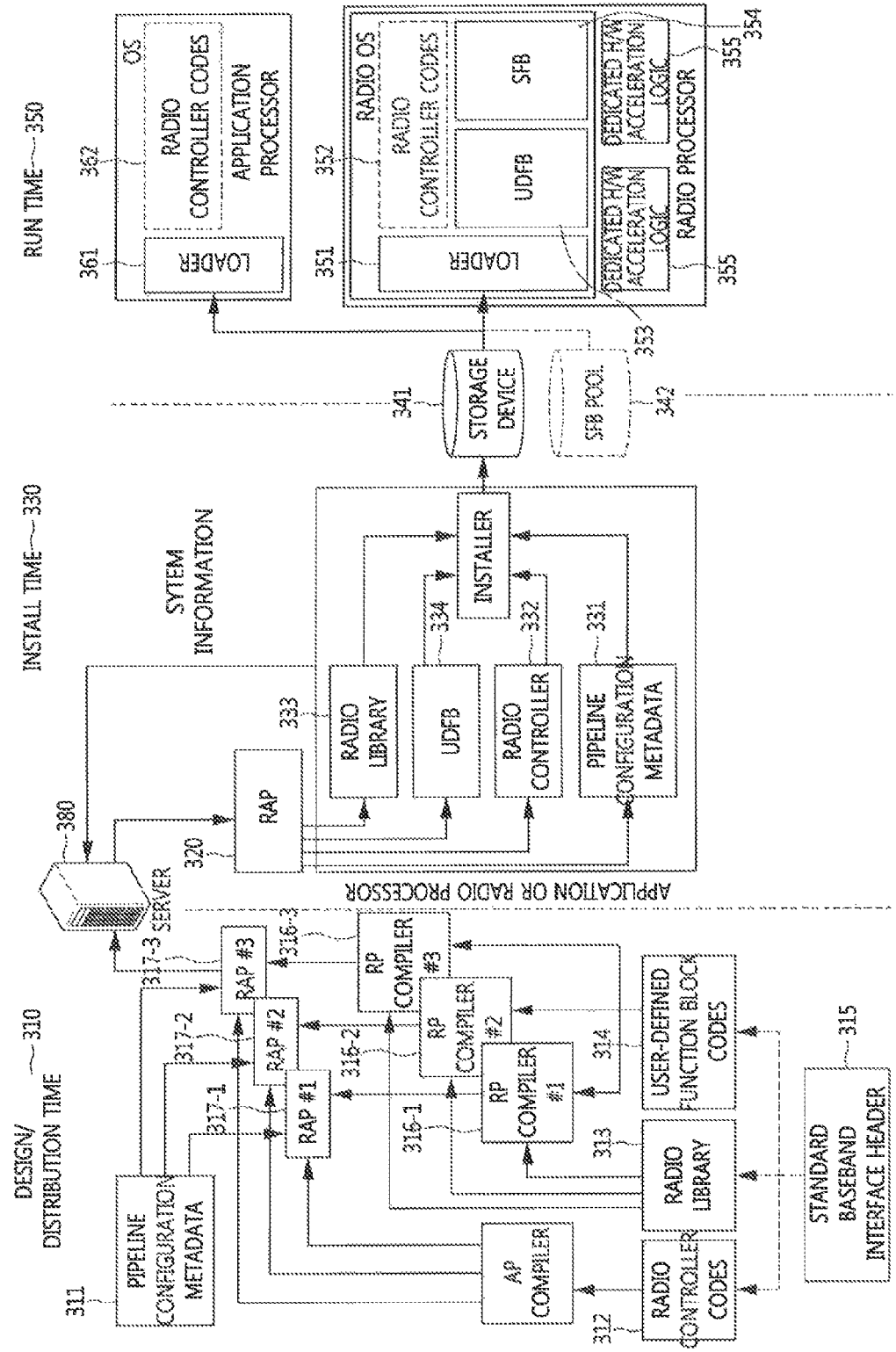
Figure 5:
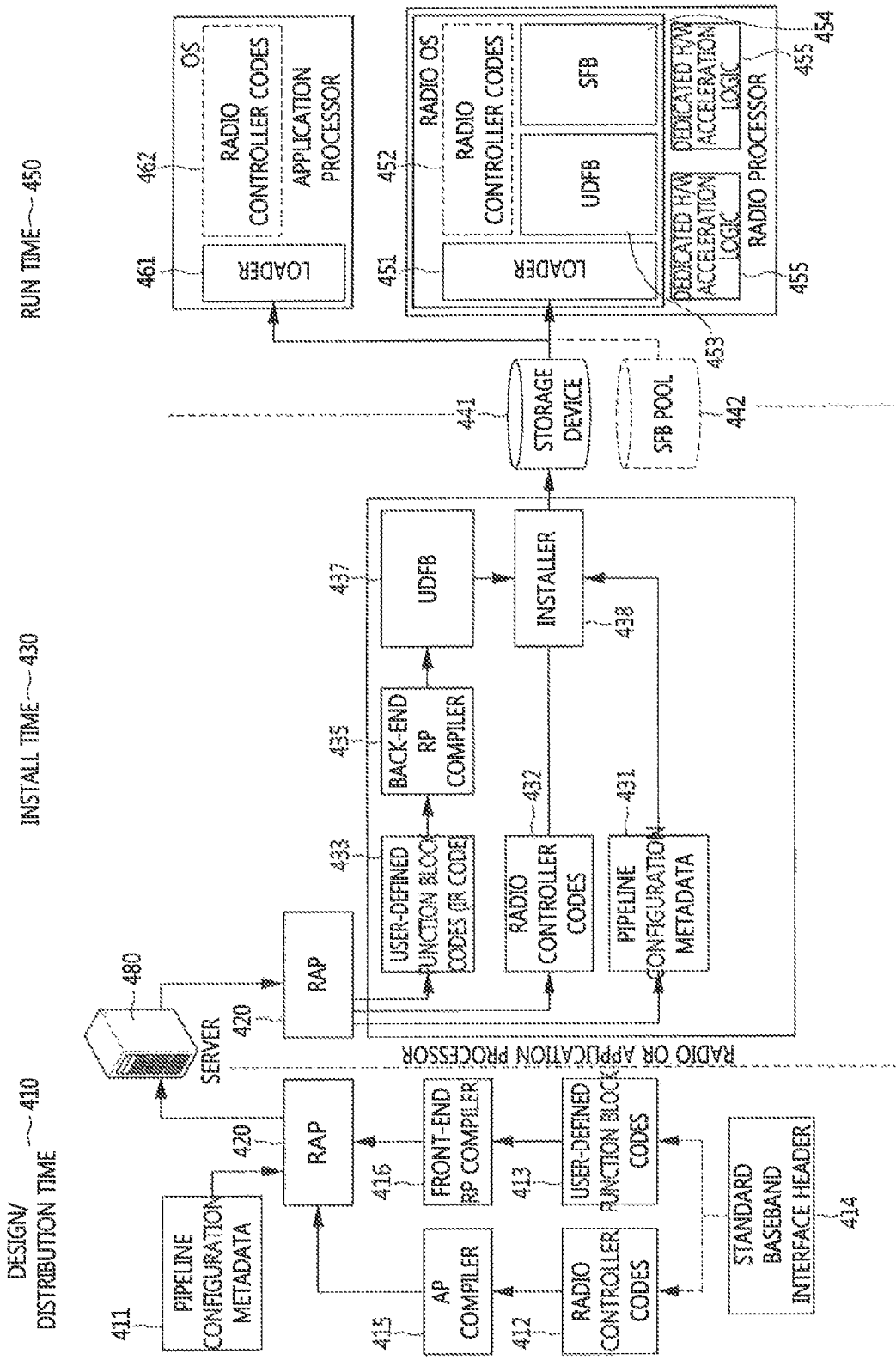

Methods for Distribution, Installation, and Operation of Radio Applications According to the Present Invention FIGS. 3 to 5 are conceptual diagrams to illustrate procedures for distribution to execution of radio applications according to the present invention.

The user-defined function block codes included in a radio application according to the present invention may be provided in at least one of source code form, executable code form (i.e. object code form), and intermediate representation (IR) form (or, two or more forms can be combined and provided). According to the provided forms, at least one of distribution, installation, and execution methods shown in FIGS. 3 to 5 may be selected.

For example, FIG. 3 illustrates a process in which user-defined function block codes in source code form are distributed and executed, and FIG. 4 illustrates a process in which user-defined function block codes and standard function block codes (radio library) are distributed together in executable code form and executed, and FIG. 5 illustrates a process in which user-defined function block codes in IR form are distributed and executed.

Hereinafter, composition of a radio application package (RAP) for distribution of a radio application according to the present invention will be explained in detail.

Figure 6:
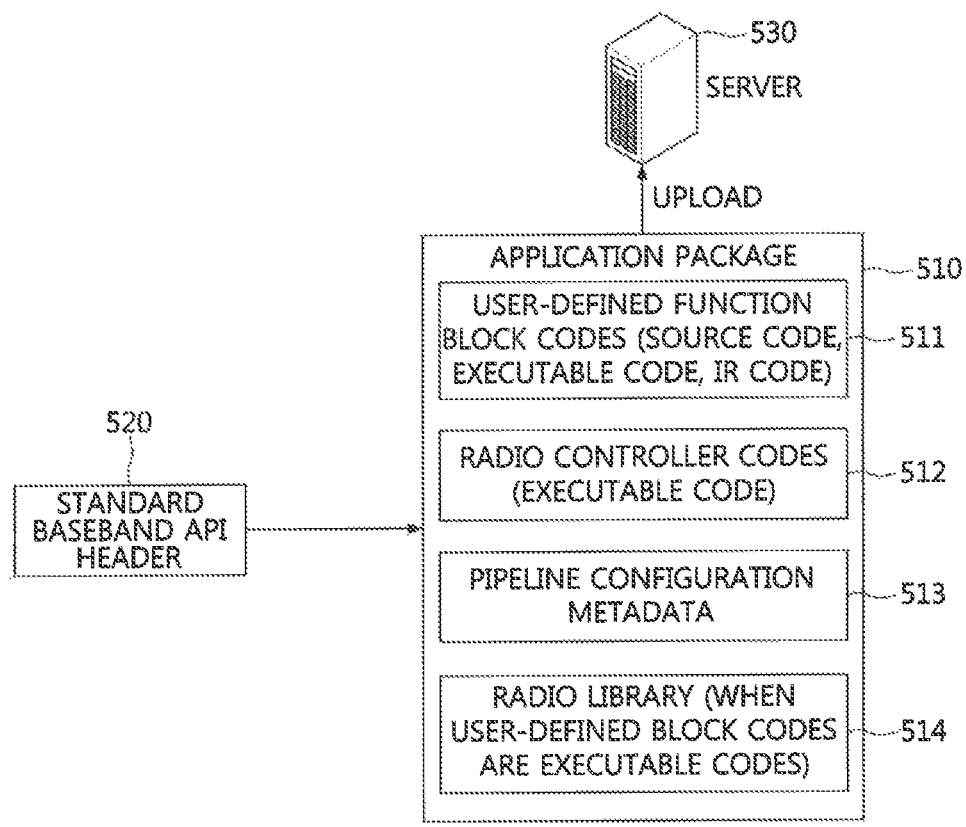
FIG. 6 is a block diagram to explain a configuration example of a radio application package according to the present invention.

FIG. 6 is a block diagram to explain a configuration example of a radio application package according to the present invention.

As explained earlier, a radio application according to the present invention may comprise function blocks and a radio controller, and a radio application package 510 may be configured to comprise user-defined function block codes 511, radio library, and radio controller codes 512 for them. Thus, the radio application package for distribution of radio application may basically comprise user-defined function block codes 511 and radio controller codes 512. Also, it may further comprise pipeline configuration metadata 513.

The radio controller codes may be determined to be included in the radio application package in executable code form of either the radio processor or the application processor according to software architecture environment explained through FIG. 1 and FIG. 2. That is, if the radio control framework is divided into the application processor layer part and the radio processor layer part, the radio controller codes may be configured as codes executable on the application processor. Otherwise, if the radio control framework is executed only on the radio processor, the radio controller codes may be configured as codes executable on the radio processor. Meanwhile, the user-defined function block codes are codes which always operate on the radio processor, and so the radio application package may include the user-defined function block codes in executable code form of the radio processor, in source code form, or in IR form.

A pipeline means a combination of radio controller, user-defined function blocks, and standard function blocks for implementing transmission or reception functions of the radio application and their relations, and may be defined based on the pipeline configuration metadata.

Also, if the standard function block codes are configured as codes executable on cores of the radio processor, the radio application package 510 may be configure to further comprise radio library 514 in executable code form (executable code of the radio processor cores) as explained earlier.

The radio application package 510 may be downloaded from a server 530 onto the OS of the application processor layer, and the user-defined function block codes 512 and the radio library 514 may be loaded from the application processor to the radio processor by referring to the pipeline configuration metadata, and finally loaded to the radio OS on the radio processor layer.

Referring to FIGS. 3 to 5, a process from distribution to execution of radio applications according to the present invention may comprise three steps including a design and distribution time, an installation time, and a run time.

(1) Design/Distribution Time

A design/distribution step (210 of FIG. 3, 310 of FIG. 4, and 410 of FIG. 5) is a step in which a radio application is designed and distributed. A radio application supplier generates a radio application package 220 comprising radio controller codes 212 and user-defined function block codes 231 for implementing the radio application. Here, the radio controller codes and the user-defined function block codes are written to call standard function blocks by using standard baseband API header 214 defining standard baseband interfaces. Meanwhile, the radio controller codes may be included in the radio application package 220 in executable code form through a compiler 215.

In FIG. 4, the user-defined function block codes 314 are also included in radio application packages 317-1 to 317-3 via compilers 316-1 to 316-3 in executable code form. In FIG. 5, the user-defined function block codes 413 are included in a radio application package 420 via a front-end compiler 416 in intermediate representation form.

Also, when the user-defined function block codes are distributed in source code form as shown in FIG. 3, the user-defined function block codes may be distributed in encrypted source code form via an encryptor 216 which is an optional component. If the user-defined function block codes are distributed in source code form, the user-defined function block codes may be compiled in a terminal which will execute the user-defined function block codes, and thereby device-independency of the user-defined function block codes may be achieved.

Meanwhile, as shown in FIG. 4, when the user-defined function block codes are distributed in executable code form which can be directly executed in a terminal, the user-defined function block codes 314 may be compiled by a compiler suitable for an execution environment of the terminal among various compilers 316-1 to 316-3, and included in the radio application package in executable code form . . . . Also, the radio library which is a set of standard function blocks which operate on cores of the radio processor may be compiled by a compiler suitable for execution environment of the terminal, and included in the radio application package 317-1 to 317-3 in executable code form.

The radio application package generated according to the above-described procedure may be uploaded to a distribution sever (e.g. radio application store; 280, 380, and 480), and then downloaded to a terminal desiring to use the corresponding radio application.

Figure 7:
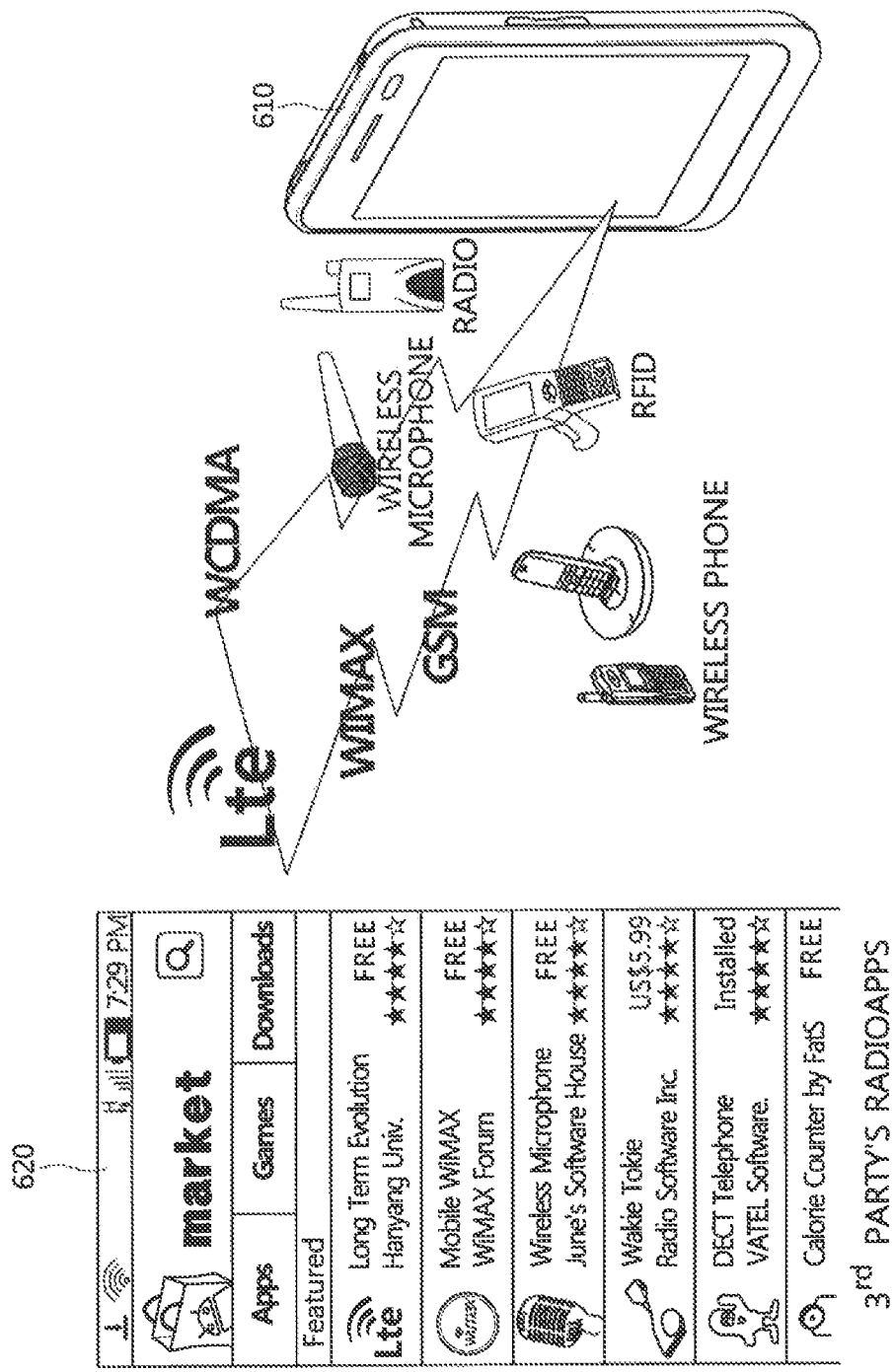
FIG. 7 is a conceptual diagram showing an example in which a radio application according to an embodiment of the present invention is available in an online market.

FIG. 7 is a conceptual diagram showing an example in which a radio application according to an embodiment of the present invention is available in an online store.

Referring to FIG. 7, a user may access an on-line app store 620 via a terminal 610, select a desired radio application in a list of radio applications provided by the on-line app store, which support various radio access technologies, and download a radio application package corresponding to the selected radio application.

The various radio access technologies may include Long Term Evolution (LTE), Wideband Code Division Multiple Access (WCDMA), Worldwide Interoperability for Microwave Access (WiMax), Global System for Mobile Communications (GSM), Radio-Frequency Identification (RFID), and so on. The user may freely select a radio application to be used situationally among a plurality of radio applications which have been downloaded and installed in the terminal.

(2) Install Time

The install step (230 of FIG. 3, 330 of FIG. 4, and 430 of FIG. 5) is a step in which a radio application package is downloaded and installed in a terminal. Here, user-defined function block codes, radio controller codes, and pipeline configuration metadata which are included in the radio application package may be installed in the application processor layer or the radio processor layer. That is, the radio controller codes may be installed in the application processor layer or the radio processor layer, and the user-defined function block codes may be installed in the radio processor layer. If the standard function block codes are in executable code form of the radio processor, the radio application package may further comprise a radio library including the executable code as mentioned earlier.

Here, as shown in FIG. 1, if the user-defined function block codes are in source code form, the user-defined function block codes may be complied and generated into at least one executable user-defined function block by a compiler (i.e. a RP compiler 235). The compile 235 may operate on the application processor or the radio processor. That is, the compiler 235 may perform a role of compiling the user-defined function block codes in source code form into the executable code of the radio processor, and it may operate on the radio processor or the application processor.

If the user-defined function block codes are encrypted, the encrypted source code may be compiled after being decrypted by a decryptor 236 which is an optional component.

Figure 8:
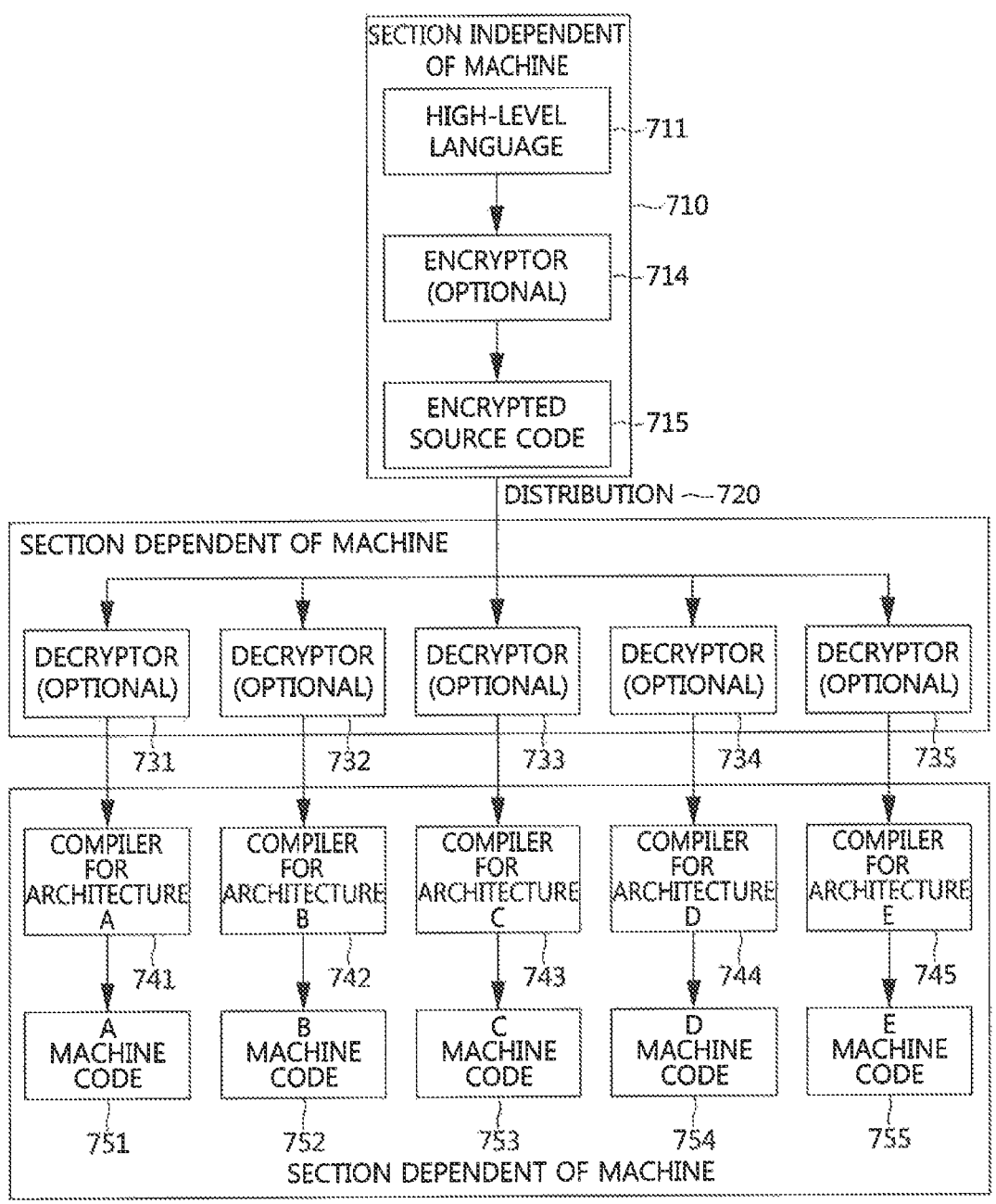
FIG. 8 is a block diagram to explain distribution and installation of user-defined function block codes in source code form, according to an example embodiment of the present invention.

FIG. 8 is a block diagram to explain distribution and installation of user-defined function block codes in source code form, according to an example embodiment of the present invention.

Referring to FIG. 8, the user defined codes 711 may be written in high-level language such as C or C++ during development of the radio application. Optionally, the user defined function block codes 711 may be converted into encrypted source codes 715 by an encoder 914.

The encrypted source codes 715 generated in the above-described manner may be distributed to each terminal as included in radio application package. In the procedure of installation to the terminal, the encrypted source codes may be converted to machine codes 751 to 755 executable in a modem hardware embedded in the terminal by decoders 731 to 735 and compilers 741 to 745. Since the compilers 741 to 745 are required to generate machine codes optimized for a modem hardware embedded in the terminal, the compilers are dependent on the modem hardware. Radio processor vendors may develop compilers optimized for their radio processors, embed the compilers within their radio processors, or provide them to vendors of terminals using their radio processors. The compiler optimized for the radio processor may be implemented to operate on the radio processor or the application processor.

Meanwhile, if the user-defined function block codes are compiled for the terminal and distributed in executable codes, the compiling in the install step is not necessary as shown in FIG. 4.

Figure 9:
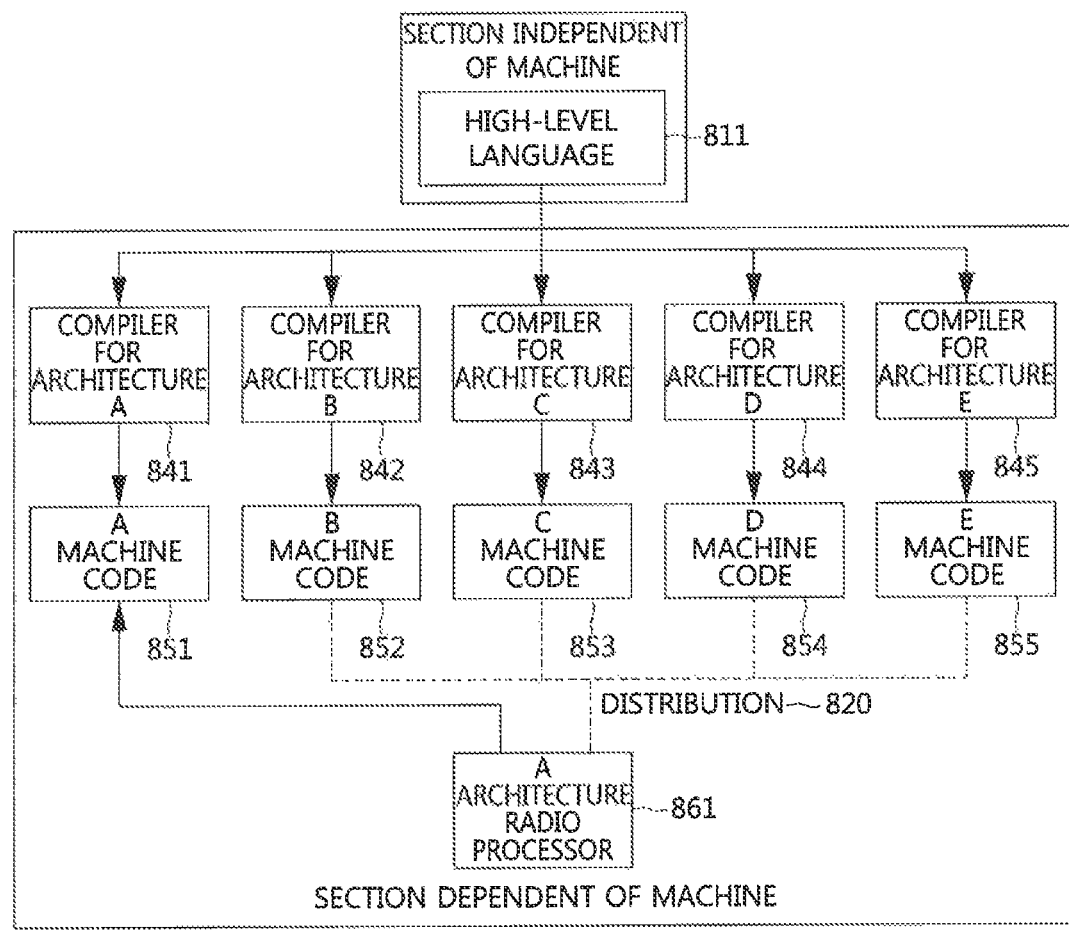
FIG. 9 is a block diagram to explain another example of distribution and installation of user-defined function block codes in source code form, according to an example embodiment of the present invention.

FIG. 9 is a block diagram to explain another example of distribution and installation of user-defined function block codes in source code form, according to an example embodiment of the present invention.

Referring to FIG. 9, the user defined function block codes 911 may be written in high-level language such as C or C++ during development of the radio application, may be compiled into executable machine codes 851-855 by one of compilers 841-845, suitable for corresponding radio processor. These machine codes 851-855 may be packaged to respective radio application package for each, and the radio application packages may be uploaded to a radio application server. The terminal may download the radio application operable in its radio processor 861. Thus, suppliers of modem hardware may produce compilers 941-945 optimized to their modem hardware, and provide them to radio application developers.

Referring to FIGS. 3 to 5, the radio application installation step may be performed in the application processor or the radio processor. That is, the compiler and the storage illustrated in FIGS. 3 to 5 may exist in at least one of the application processor and the radio processor, or in both the application processor and the radio processor.

(3) Run Time

The run time (250 of FIG. 3, 350 of FIG. 4, and 450 of FIG. 5) is a step in which an installed radio application is executed in an actual terminal. In this step, corresponding components of the radio application, for radio signal processing, may be loaded on the application processor or the radio processor, and executed for performing radio communications.

For example, when an execution command of the radio application installed in the terminal is received, a loader 254, 255, 354, 355, 454, and 455 may determine which function blocks are needed for executing the radio application by referring to the pipeline configuration metadata 231, 331, and 431. Based on this, a radio controller and user-defined function blocks may be loaded from the storage 251, 252, and 253 of the terminal. Also, the loader loads radio controller codes into the application processor layer or the radio processor layer (as mentioned earlier, it is determined according to operation layer of the radio controller framework which layer the radio controller codes are loaded into), and the user-defined function blocks and standard function blocks may be loaded into the radio processor layer by referring to the pipeline configuration metadata.

A standard function block pool 252, 253, 352, 353, 452, or 453 is a set of standard function blocks, and exists in the radio processor layer or in the application processor layer. In the standard function block pool, there may exist standard function blocks implemented using dedicated hardware and standard function blocks executed on cores of the radio processor. In the step for an installer to install the radio application by referring to the pipeline configuration metadata in the rum time, standard function blocks to be used by the corresponding radio application may be selected from the standard function block pool and installed in the storage.

Figure 10:
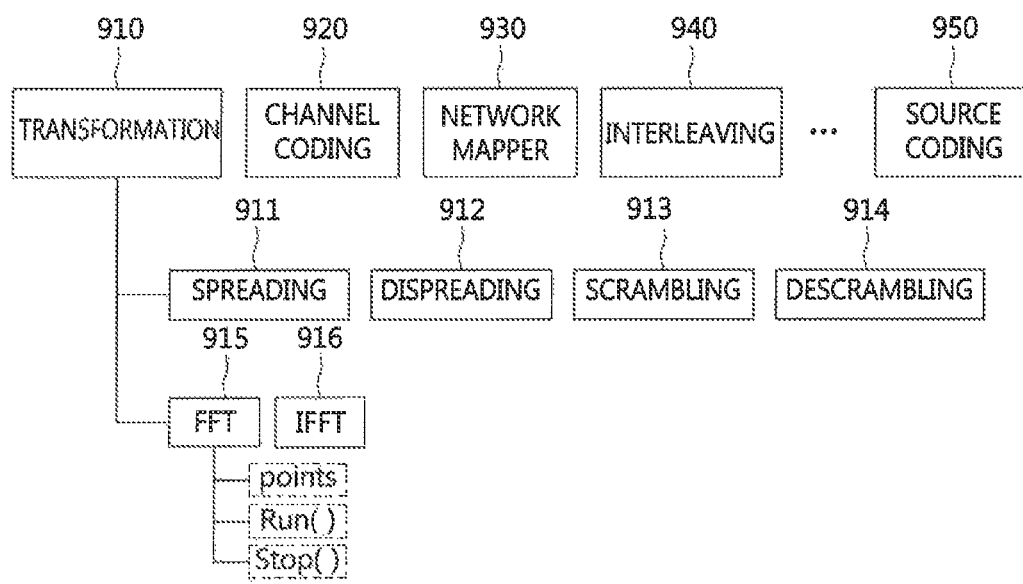
FIG. 10 is a conceptual diagram to explain an example standard baseband interface according to an example embodiment of the present invention.

FIG. 10 is a conceptual diagram to explain an example standard baseband interface according to an example embodiment of the present invention.

Referring to FIG. 10, a standard baseband interface is an application programming interface (API) standardizing digital signal processing algorithms needed for baseband domain in modem, and the standard interfaces 910-950 and the standard function blocks 911-914 are shown as an example.

As a type of the standard interface, the standard interface may include a transformation 910, a channel coding 920, a network mapper 930, an interleaving 940, and a source coding 950 and so on. Also, as standard function blocks for the transformation 910, a spreading 911, a dispreading 912, a scrambling 913, a descrambling 914, a Fast Fourier Transform (FFT) 915 and an Inverse Fast Fourier Transform (IFFT) 916 may be defined.

For example, Input/Out data through the FFT 915, properties of the data, and member functions may be defined for the FFT 215. Also, an object-oriented design of radio application may be made possible by assigning common properties to function blocks having the same type.

Meanwhile, in the example embodiments of the present invention, a standard application programming interface (API) header file which is written in high-level language according to the above-described standard baseband interface may be used. Therefore, a developer of radio application may develop radio applications by referring to the standard interface API header.

Distribution of Radio Application

Hereinafter, a procedure of distributing radio application for a software defined radio terminal according to an example embodiment of the present invention will be explained.

Figure 11:
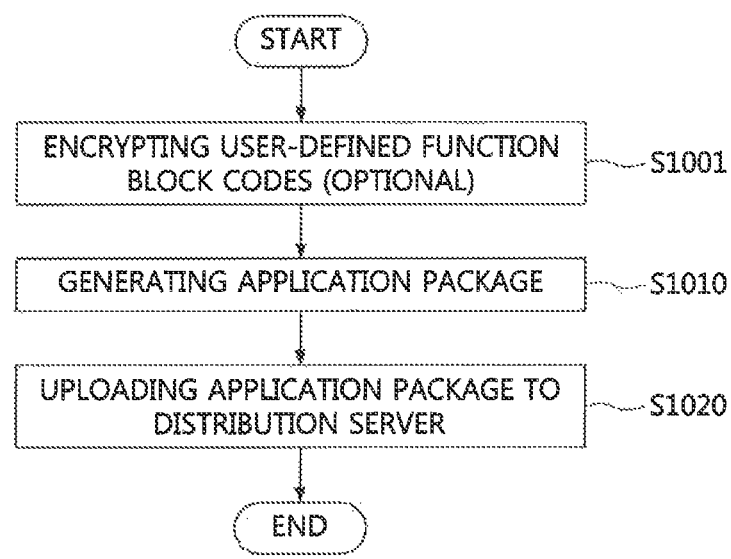
FIG. 11 is a flow chart to show a procedure of distributing a radio application according to an example embodiment of the present invention.

FIG. 11 is a flow chart to show a procedure of distributing a radio application according to an example embodiment of the present invention.

Referring to FIG. 11, a procedure of distributing a radio application according to an example embodiment of the present invention may be configured to include a step of encrypting user-defined function block codes S1001, a step of generating application package S1010, and a step of distributing application package S1020.

In addition, the step S1010 of generating an application package may comprise a step of generating and compiling user-defined function block codes, a step of generating and compiling radio controller codes, a step of generating pipeline configuration metadata, and a step of generating an application package.

As described above, radio applications according to the present invention may be distributed in form of application packages each of which comprises user-defined function block codes, radio controller codes, and pipeline configuration metadata. If the user-defined function block codes are configured in executable code form, the application package may further comprise a radio library in executable code form as explained earlier.

Hereinafter, each step of the distribution procedure of radio application according to an example embodiment of the present invention will be explained in detail.

The step of encrypting user-defined function block codes S1001 is a step of encrypting the user-defined function block codes to be included in a radio application package. The user-defined function block codes may be distributed in source code form, in intermediate representation (IR) form, or in executable code form, according to selection of radio application provider. In the case that the user-defined function block codes are distributed in source code form, it is desirable that the user-defined function block codes are written in standard languages in order to be compiled in various terminals. Meanwhile, in the case that the user-defined function block codes are distributed in source code form, since source codes of the user-defined function block codes may be exposed, the user-defined function block codes may be encrypted before distribution in order to prevent exposure of source codes.

The step of generating application package S1010 is a step of generating a radio application package including radio application to be executed in a software defined radio terminal. As shown in FIG. 5, the radio application package may comprise user-defined function block codes 511, radio controller codes 512, and pipeline configuration metadata 513. When the user-defined function block codes are in executable code form, the radio application package may further comprise a radio library 514.

The user-defined function block codes 511 are codes defining function blocks needed for implementing a desired radio application, and the radio controller codes 512 are codes written for performing the above-described radio controller functions. Also, the function blocks defined by the user-defined function block codes are related to implementations of digital signal processing functions which are not implemented in the standard function blocks defined in the standard baseband API header 520.

On the other hand, the user-defined function block codes 511 may be constituted as one of codes executable directly in the radio processor of the terminal which the application package 500 is installed to, codes in source code form which needs to be compiled for execution, intermediate representation, and executable codes.

Therefore, if the user-defined functions block codes 511 are in executable code form, the user-defined function block codes may be codes compiled by various compilers for various terminals.

The radio controller codes 512 may comprise codes for transferring context information to a monitor of the application layer and for sending/receiving user data to or from a networking stack of the application layer. The radio controller codes 520 may be executable codes compiled by compilers so that they can be executed by the application processor or the radio processor.

Meanwhile, the pipeline configuration metadata 513 may define function blocks needed for implementing corresponding radio application, and connections between the function blocks. Also, the pipeline configuration metadata 513 may include information on connections between the standard function blocks included in the standard baseband API header 520 and the function blocks defined by the user defined function block codes 511, and information on initial configuration values for attributes of each of the function blocks.

The user-defined function block codes 511, the radio controller codes 512, and the pipeline configuration metadata 513, which have been generated in the above-described manner, may be uploaded to a server, and may be downloaded to the terminal wanting to use the corresponding radio application and installed to the terminal, in form of application package 500.

In the step of distributing application package S1020, the application package which has been in the above-described manner may be uploaded to a radio application distribution server, and downloaded to a software defined radio terminal wanting the corresponding radio application.

Installation of Radio Application

Hereinafter, a procedure of installing radio application according to an example embodiment of the present invention will be explained.

Figure 12:
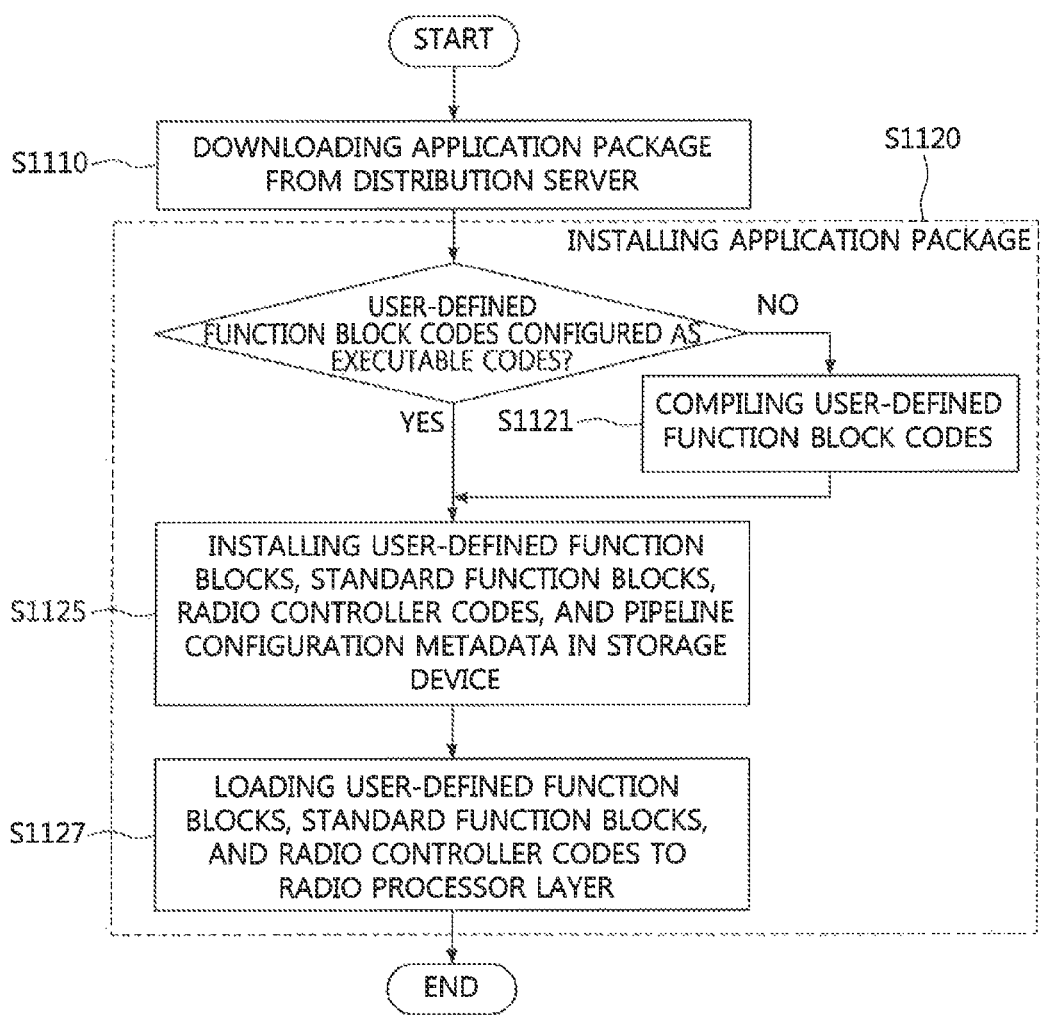
FIG. 12 is a flow chart to show a procedure of installing radio application according to an example embodiment of the present invention.

FIG. 12 is a flow chart to show a procedure of installing radio application according to an example embodiment of the present invention.

Referring to FIG. 12, the procedure of installing radio application according to an example embodiment of the present invention may be configured to include a step of downloading application package S1110 and a step of installing application package S1120.

Hereinafter, referring to FIG. 12, each step of the installation procedure of radio application according to an example embodiment of the present invention will be explained in detail.

The step of downloading application package S1110 is a step of downloading radio application to be executed in software defined radio terminal from a distribution server. In the step of downloading application package S1110, as shown in FIG. 4, the application package 500 comprising the user defined function block codes 511, the radio controller codes 512, and the pipeline configuration metadata 513 may be downloaded from the distribution server to the software defined radio terminal. Here, when the user-defined function block codes are in executable code form, the radio application package may comprise a radio library compiled into executable codes, as mentioned earlier.

The step of installing application package S1120 is a step of installing the application package downloaded from the distribution server to the terminal as a form executable by the terminal, and may include a step of compiling the user defined codes S1121, a step of installing the compiled user defined codes to the storage Si 125, and a step of loading the user defined function blocks S1127.

In step S1121 of compiling the user-defined function block codes, when the user-defined function block codes 511 included in the downloaded application package 500 are source codes or intermediate representation type codes which are different from odes that can be directly executed in a core of the radio processor of the terminal, the user-defined function block codes may be compiled into codes that can be directly executed in the core of the radio processor of the terminal to thereby create user-defined function blocks.

Also, if the user defined function block codes are encrypted, the user defined function block codes are compiled after being decrypted.

Also, the step of installing the compiled user defined function block codes to the storage S1125 is a step of installing the pipeline configuration metadata 513 included in the downloaded application package 500, the user defined function blocks defined by the user defined function block codes 511, the radio controller codes 512, and the standard function blocks which include standard command instruction codes based on the predefined standard baseband interface to the storage of the terminal by referring to the pipeline configuration metadata 514.

The step of loading the user defined function blocks S1127 is a step of loading the user defined function blocks defined by the user defined function block codes 511 included in the downloaded radio application package 500 directly to the radio processor layer. Here, if the user-defined function block codes 511 are written in code form which can be directly executed on the radio processor, the user-defined function blocks included in the user-defined function block codes 511 may be directly loaded into the radio processor layer without the user-defined function block code compiling step S1121.

While the example embodiments of the present invention and their advantages have been described in detail, it should be understood that various changes, substitutions and alterations may be made herein without departing from the scope of the invention.

The invention claimed is:

1. A radio application distribution method using a radio application package for installing a radio application into a terminal having an application processor and a radio processor, the method comprising:
generating a radio application package; and
uploading the radio application package to a server,
wherein the radio application package includes radio controller codes, function block codes, and pipeline configuration metadata,
wherein a radio control framework which operates on at least one of the application processor and the radio processor provides the radio controller codes and the function block codes with operation environments,
wherein the radio control framework includes at least one of:
a configuration manager (CM) performing installation/uninstallation of the radio application and creating/deleting an instance of the radio application and managing radio parameters for the radio application;
a radio connection manager (RCM) performing activation/deactivation of the radio application and managing user data flow switching between radio applications;
a flow controller (FC) controlling sending/receiving and flows of user data packets;
a multi-radio controller (MRC) scheduling requests for spectrum resources issued by radio applications; and
a resource manager (RM) sharing radio resources with radio applications.

2. The method of claim 1, wherein the function block codes include:
standard function block codes which are codes calling function blocks implemented using dedicated hardware logics included in a radio processor of the terminal or codes operating on a core of the radio processor of the terminal; and
user-defined function block codes which are not provided as the standard function block codes or which are customized from functions provided by the standard function block codes.

3. The method of claim 2, wherein, when the standard function block codes are provided as execution codes executable on the radio processor of the terminal, the radio application package further includes a radio library comprising the execution codes.

4. The method of claim 2, wherein the user-defined function block codes are at least one of execution codes executable on the radio processor of the terminal, source codes which can be compiled into execution codes executable on the radio processor of the terminal, and intermediate representation (IR) codes which can be compiled into execution codes executable on the radio processor of the terminal.

5. The method of claim 4, wherein, when the user-defined function block codes are source codes or IR codes, the user-defined function block codes are included in the radio application package as encrypted.

6. The method of claim 2, wherein the pipeline configuration metadata define relations among the radio controller codes, the user-defined function blocks, and the standard function blocks for data transmission functions or data reception functions of the radio application.

7. The method of claim 1, wherein the radio controller codes are execution codes executed on an application processor or the radio processor of the terminal, provide a user application with context information of the radio application, and transmit/receive data with a networking stack of a communication service layer existing on the application processor or the radio processor.

8. A method for installing a radio application into a user terminal having an application processor and a radio processor by using a radio application package, the method comprising:
   downloading a radio application package from a server; and
   installing a radio application included in the radio application package into the user terminal,
   wherein the radio application package includes radio controller codes, function block codes, and pipeline configuration metadata,
   wherein a radio control framework which operates on at least one of the application processor and the radio processor provides the radio controller codes and the function block codes with operation environments,
   wherein the radio control framework includes at least one of:
   a configuration manager (CM) performing installation/uninstallation of the radio application and creating/deleting an instance of the radio application and managing radio parameters for the radio application;
   a radio connection manager (RCM) performing activation/deactivation of the radio application and managing user data flow switching between radio applications;
   a flow controller (FC) controlling sending/receiving and flows of user data packets;
   a multi-radio controller (MRC) scheduling requests for spectrum resources issued by radio applications; and
   a resource manager (RM) sharing radio resources with radio applications.

9. The method of claim 8, wherein the function block codes include:
   standard function block codes which are codes calling function blocks implemented using dedicated hardware logics included in a radio processor of the terminal or codes operating on a core of the radio processor of the terminal; and
   user-defined function block codes which are not provided as the standard function block codes or which are customized from functions provided by the standard function block codes.

10. The method of claim 9, wherein, when the standard function block codes are provided as execution codes executable on the radio processor of the terminal, the radio application package further includes a radio library comprising the execution codes.

11. The method of claim 9, wherein the user-defined function block codes are at least one of execution codes executable on the radio processor of the terminal, source codes which can be compiled into execution codes executable on the radio processor of the terminal, and intermediate representation (IR) codes which can be compiled into execution codes executable on the radio processor of the terminal.

12. The method of claim 11, wherein, when the user-defined function block codes are source codes or IR codes, the user-defined function block codes are compiled using a compiler executed by the application processor or the radio processor of the terminal.

13. The method of claim 11, wherein, when the user-defined function block codes are source codes or IR codes, the user-defined function block codes are included in the radio application package as encrypted.

14. The method of claim 8, wherein the radio controller codes are execution codes executed on an application processor or the radio processor of the terminal, provide a user application with context information of the radio application, and transmit/receive data with a networking stack of a communication service layer existing on the application processor or the radio processor.

15. The method of claim 8, wherein, in the installing the radio application, the radio controller codes and the function block codes are installed into a storage device which can be accessed by at least one of an application processor and a radio processor of the terminal by referring to the pipeline configuration metadata.

16. A method of executing a radio application comprising function block codes and radio controller codes in a terminal having an application processor and a radio processor, the method comprising:
   receiving an execution instruction for the radio application; and
   loading the radio controller codes and the function block codes from a storage part by referring to pipeline configuration metadata of the radio application,
   wherein the radio controller codes are executed by the application processor or the radio processor, and the user-defined function block codes are executed by the radio processor,
   wherein a radio control framework which operates on at least one of the application processor and the radio processor provides the radio controller codes and the function block codes with operation environments,
   wherein the radio control framework includes at least one of:
   a configuration manager (CM) performing installation/uninstallation of the radio application and creating/deleting an instance of the radio application and managing radio parameters for the radio application;
   a radio connection manager (RCM) performing activation/deactivation of the radio application and managing user data flow switching between radio applications;
   a flow controller (FC) controlling sending/receiving and flows of user data packets;
   a multi-radio controller (MRC) scheduling requests for spectrum resources issued by radio applications; and
   a resource manager (RM) sharing radio resources with radio applications.

17. The method of claim 16, wherein the function block codes include:
   standard function block codes which are codes calling function blocks implemented using dedicated hardware logics included in a radio processor of the terminal or codes operating on a core of the radio processor of the terminal; and
   user-defined function block codes which are not provided as the standard function block codes or which are customized from functions provided by the standard function block codes.

18. The method of claim 16, wherein, when the radio control framework operates on both the application processor and the radio processor, the radio control framework is configured to comprise a part executed on the application processor and a part executed on the radio processor.

19. The method of claim 16, wherein, when the radio control framework operates on both the application processor and the radio processor, the radio controller codes operate on the application processor.

20. The method of claim 16, wherein, when the radio control framework operates only on the radio processor, the radio controller codes operate only on the radio processor.

* * * * *